United States Patent [19]
Johary et al.

[11] Patent Number: 5,142,363
[45] Date of Patent: Aug. 25, 1992

[54] METHOD AND APPARATUS FOR SCALING INTERLACED IMAGES

[75] Inventors: Arun Johary; Mark A. Rosenau, both of San Jose, Calif.

[73] Assignee: Chips and Technologies, Inc., San Jose, Calif.

[21] Appl. No.: 673,040

[22] Filed: Mar. 21, 1991

Related U.S. Application Data

[63] Continuation of Ser. No. 578,704, Sep. 6, 1990, Pat. No. 5,025,315.

[51] Int. Cl.$^5$ ............................................. H04N 7/01
[52] U.S. Cl. ..................................... 358/140; 358/160
[58] Field of Search ............... 358/140, 160, 180, 183, 358/77, 451; 340/731

[56] References Cited

U.S. PATENT DOCUMENTS

| | | | |
|---|---|---|---|
| 4,402,012 | 8/1983 | Knight | 358/160 |
| 4,746,981 | 5/1988 | Nadan et al. | 358/183 X |
| 4,866,520 | 9/1989 | Nomura et al. | 358/140 |

*Primary Examiner*—Victor R. Kostak
*Attorney, Agent, or Firm*—Townsend and Townsend

[57] ABSTRACT

A method and apparatus for scaling interlaced video data allows the video data to be scaled to any desired size, either larger or smaller than the original image. The method considers each line of input data in each field sequentially, and determines whether the line is to be saved and whether the data lines in each successive field will also be saved, discarded, or duplicated, saving space in the output buffer for the saved and duplicated data lines to come as necessary. The method can accommodate interlaced data with N field and a scaling factor M.

5 Claims, 4 Drawing Sheets

| FIELD | LINE NUMBER | SCALE | LOGIC OUTPUT | LOGIC SWITCH | INCREMENT ADDRESS | WRITE LINE TO ADDRESS | DISPLAY |
|---|---|---|---|---|---|---|---|
| 0 | 0 | 4/3 | 1,1 | ON | 2 | 0 | |
| | 2 | | 0,1 | | 3 | 2,3 | INPUT 0 |
| | 4 | | 1,0 | | 3 | 5 | INPUT 1 |
| | 6 | | 1,1 | | 2 | 8 | INPUT 2 |
| | 8 | | 0,1 | | 3 | 10,11 | INPUT 2 |
| | 10 | | 1,0 | | 3 | 13 | INPUT 3 |
| | 12 | | 1,1 | | 2 | 16 | INPUT 4 |
| 1 | 1 | | 1,0 | | 3 | 1 | INPUT 5 |
| | 3 | | 1,1 | | 2 | 4 | INPUT 5 |
| | 5 | | 0,1 | | 3 | 6,7 | INPUT 6 |
| | 7 | | 1,0 | | 3 | 9 | INPUT 7 |
| | 9 | | 1,1 | | 2 | 12 | INPUT 8 |
| | 11 | | 0,1 | | 3 | 14,15 | INPUT 8 |
| | 13 | | 1,0 | | 3 | 17 | INPUT 9 |
| | | | | | | | INPUT 10 |
| | | | | | | | INPUT 11 |
| | | | | | | | INPUT 11 |
| | | | | | | | INPUT 12 |
| | | | | | | | INPUT 13 |

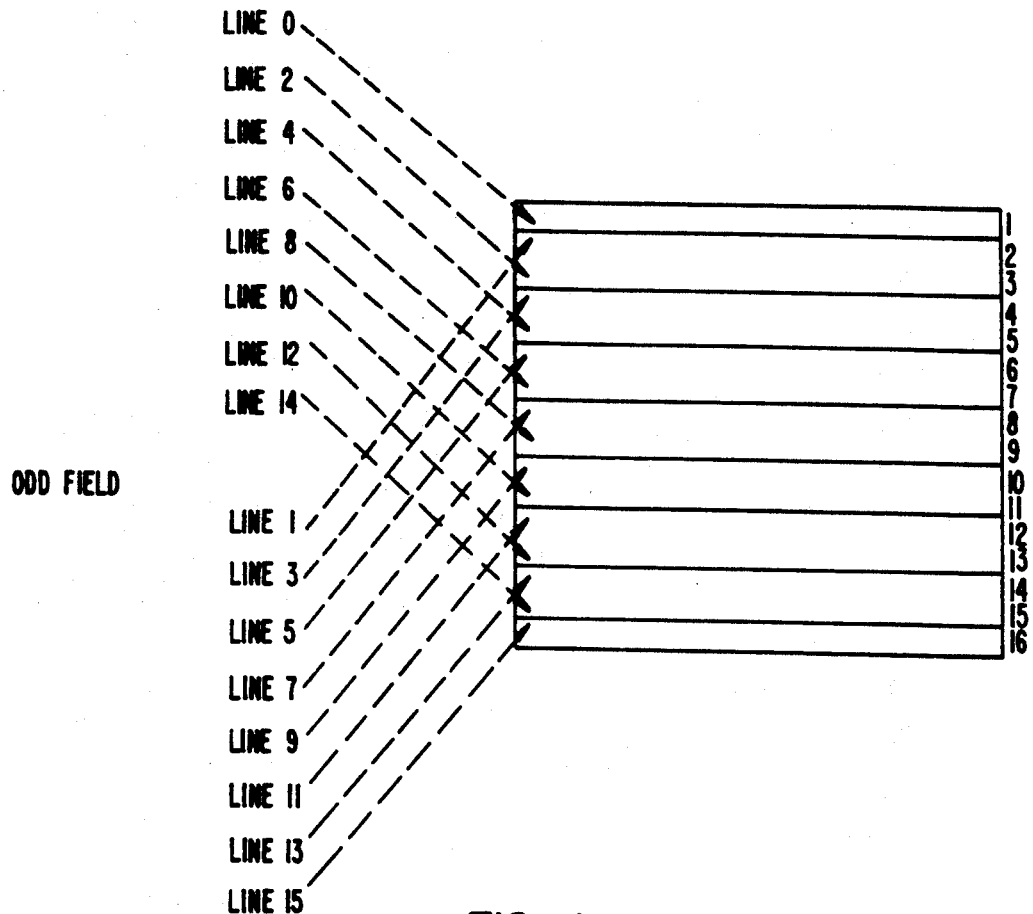

|  | INPUT LINE | CAPTURE DECISION | OUTPUT IMAGE ORDER |
|---|---|---|---|
| FIELD 1 | | | |
| | LINE 0 | CAPTURE TO LINE 0 | INPUT LINE 0 |
| | LINE 2 | CAPTURE TO LINE 2 | INPUT LINE 3 |
| | LINE 4 | DROP | INPUT LINE 2 |
| | LINE 6 | CAPTURE TO LINE 4 | INPUT LINE 5 |
| | LINE 8 | CAPTURE TO LINE 6 | INPUT LINE 6 |
| | LINE 10 | DROP | INPUT LINE 9 |
| | LINE 12 | CAPTURE TO LINE 8 | INPUT LINE 8 |
| | LINE 14 | CAPTURE TO LINE 10 | INPUT LINE 11 |
| FIELD 2 | | | INPUT LINE 12 |
| | LINE 1 | DROP | INPUT LINE 15 |
| | LINE 3 | CAPTURE TO LINE 1 | INPUT LINE 14 |
| | LINE 5 | CAPTURE TO LINE 3 | |
| | LINE 7 | DROP | |
| | LINE 9 | CAPTURE TO LINE 5 | |
| | LINE 11 | CAPTURE TO LINE 7 | |
| | LINE 13 | DROP | |
| | LINE 15 | CAPTURE TO LINE 9 | |

*FIG._3.*

| FIELD | LINE NUMBER | SCALE FACTOR | KEEP/DROP COUNTER | LOGIC SWITCH | DISPLAY |
|---|---|---|---|---|---|
| 0 | 0 | 5/6 | 0,1 | ON | INPUT LINE 0 |
| | 2 | | 2,3 | | INPUT LINE 1 |
| | 4 | | 4,X | | INPUT LINE 2 |
| | 6 | | 0,1 | | INPUT LINE 3 |
| | 8 | | 2,3 | | INPUT LINE 4 |
| | 10 | | 4,X | | INPUT LINE 6 |
| | 12 | | 0,1 | | INPUT LINE 7 |
| 1 | 1 | | 1,2 | | INPUT LINE 8 |
| | 3 | | 3,4 | | INPUT LINE 9 |
| | 5 | | X,0 | | INPUT LINE 10 |
| | 7 | | 1,2 | | INPUT LINE 12 |
| | 9 | | 3,4 | | INPUT LINE 13 |
| | 11 | | X,0 | | |
| | 13 | | 1,2 | | |

*FIG._5.*

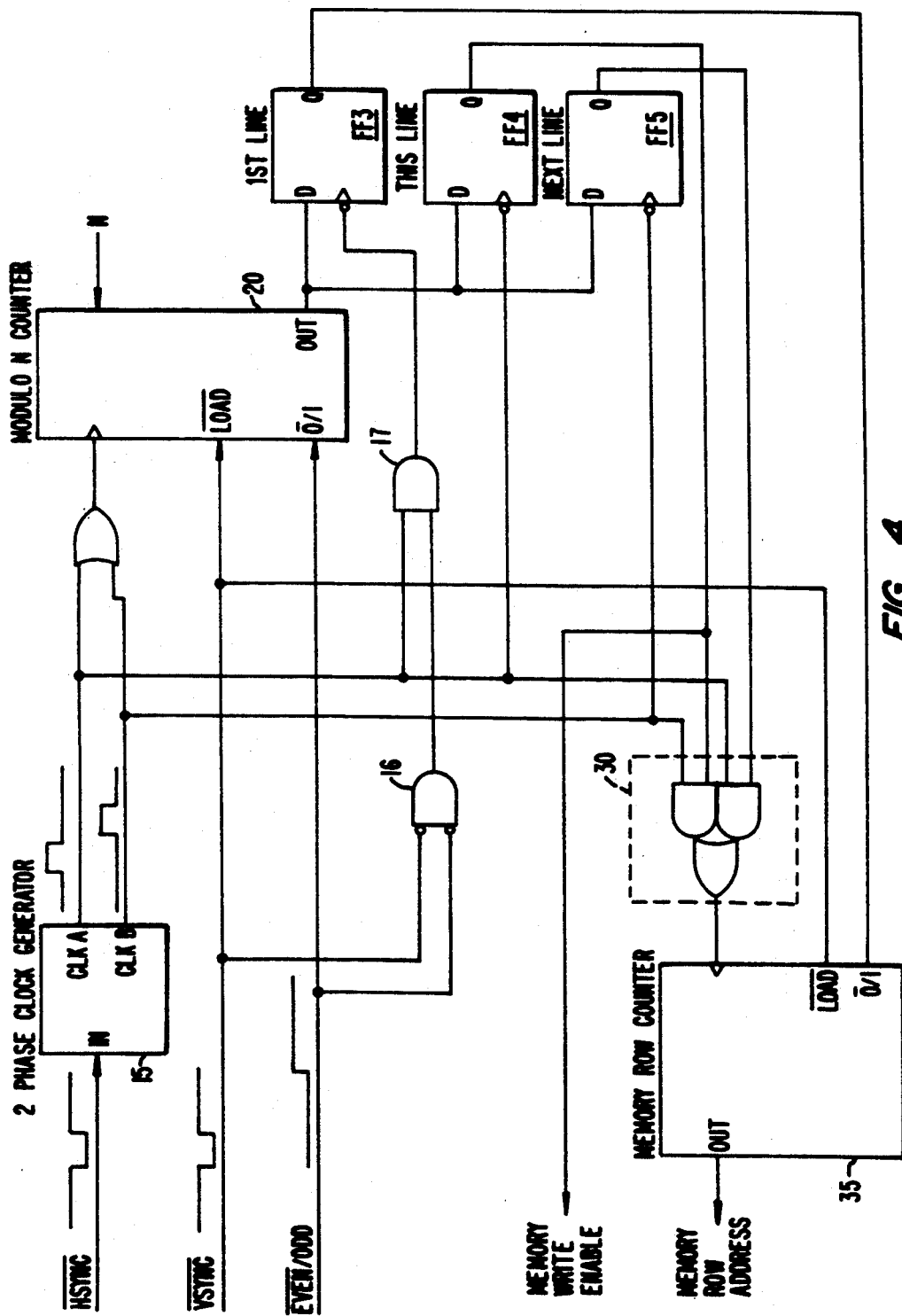
FIG._4.

| FIRST FIELD THIS LINE | SECOND FIELD NEXT LINE | ACTION | ADDRESS COUNTER |
|---|---|---|---|
| KEEP | KEEP | STORE THIS LINE; LEAVE BLANK SPACE | +2 |
| KEEP | DROP | STORE THIS LINE; LEAVE NO SPACE | +1 |
| DROP | KEEP | DROP THIS LINE; LEAVE BLANK SPACE | +1 |
| DROP | DROP | DROP THIS LINE; LEAVE NO SPACE | +0 |

*FIG._6.*

| FIELD | LINE NUMBER | SCALE | LOGIC OUTPUT | LOGIC SWITCH | INCREMENT ADDRESS | WRITE LINE TO ADDRESS | DISPLAY |
|---|---|---|---|---|---|---|---|
| 0 | 0 | 4/3 | 1,1 | ON | 2 | 0 | |
| | 2 | | 0,1 | | 3 | 2,3 | INPUT 0 |
| | 4 | | 1,0 | | 3 | 5 | INPUT 1 |
| | 6 | | 1,1 | | 2 | 8 | INPUT 2 |
| | 8 | | 0,1 | | 3 | 10,11 | INPUT 2 |
| | 10 | | 1,0 | | 3 | 13 | INPUT 3 |
| | 12 | | 1,1 | | 2 | 16 | INPUT 4 |
| 1 | 1 | | 1,0 | | 3 | 1 | INPUT 5 |
| | 3 | | 1,1 | | 2 | 4 | INPUT 5 |
| | 5 | | 0,1 | | 3 | 6,7 | INPUT 6 |
| | 7 | | 1,0 | | 3 | 9 | INPUT 7 |
| | 9 | | 1,1 | | 2 | 12 | INPUT 8 |
| | 11 | | 0,1 | | 3 | 14,15 | INPUT 8 |
| | 13 | | 1,0 | | 3 | 17 | INPUT 9 |
| | | | | | | | INPUT 10 |
| | | | | | | | INPUT 11 |
| | | | | | | | INPUT 11 |
| | | | | | | | INPUT 12 |
| | | | | | | | INPUT 13 |

*FIG._7.*

METHOD AND APPARATUS FOR SCALING INTERLACED IMAGES

This is a continuation division of application Ser. No. 07/578,704 filed Sept. 6, 1990 now Pat. No. 5,025,315, issued on May 18, 1991.

BACKGROUND OF THE INVENTION

This invention relates to the production and display of interlaced video images. A method and apparatus for scaling interlaced video images is disclosed.

Most known display devices, including cathode ray tubes ('CRTs') and liquid crystal displays ('LCDs'), have picture elements which must be refreshed every few moments to prevent image flickering and the consequent loss of the image. A common method to prevent this flickering and loss of picture, which has been in use for many decades, is to interlace the video data. As shown in FIG. 1, video data is stored and/or transmitted sequentially in two fields, the first field containing all the data for the even display lines and the second field containing all the data for the odd display lines. For purposes of this description, the first line of the display will be line 0 and it is even. This designation is arbitrary and can be changed without in any way altering the substance of the invention. In operation, all the data for the even numbered lines contained in the first field is displayed first, followed by all the data for the odd-numbered lines contained in the second field. Using this alternation of even and odd fields results in adjacent picture elements being refreshed often enough to prevent or to minimize the effects of the fading or "flickering" of the individual picture elements. This technique is commonly called interlacing.

Although interlacing video data produces acceptable picture quality with relatively inexpensive components, it is not without problems. In particular, scaling the video data to produce scaled video images presents several difficulties. In this description, scaling includes both the enlargement or shrinkage of the image. In order to scale down or reduce the image, a certain number of input pixels must be mapped to a smaller number of output pixels. This can be done by either discarding some pixels according to the difference in the size of the input image and the desired output image or performing a weighted arithmetic averaging to reduce the total number of pixels. Obviously, using either technique requires the knowledge of which pixels are to be dropped or combined by averaging.

As the shape of the output image can be any rectangular shape (with or without the same aspect ratio as the input window), the scaling factor must be applied independently in both the vertical ('Y') and horizontal ('X') direction. Also, it is desirable to be able to scale the image independently in both the X and Y directions.

A simple way of shrinking an image is to drop some pixels. To improve the quality of the image so produced, the pixels should be dropped uniformly across the input image. For example, the determination as to whether a pixel in the X-direction is to be dropped can be made by having a simple counter that generates a periodic pulse by dividing the input pixel rate (pixel clock) by a variable scaling factor. With a programmable divider, the image can be scaled in the X-direction by any desired factor.

To scale the image in a vertical direction, some lines of the image will have to be skipped entirely. This can be done by dividing the line rate by the vertical scale factor and using the output of the division operation to determine if the next line should be dropped. Circuits to perform both the horizontal and vertical divisions have been known and used for many years.

The scaling process can be done at several different times. In one method, the entire image is stored in a frame buffer. The image is then selectively copied, using the horizontal and vertical divisions, into a second frame buffer. Although this process works, it is slow. Also, as parts of the image which will not be displayed are stored, albeit temporarily, a system using this process requires extra memory and is more expensive. A better method is to perform the scaling process as the image is placed in the frame buffer. This method is particularly attractive as almost: all images are generated by a raster scan process.

In a raster scan process, the image is broken down horizontally and vertically and transmitted to the buffer in serial fashion. To scale the image, each pixel as it reaches the frame buffer is either stored and the frame buffer address pointer incremented, or the pixel is ignored and the frame buffer address pointer remains the same.

As discussed, many images are produced using an interlaced data format. The simple scaling techniques mentioned previously, when used on interlaced video data, can result in either the dropping of adjacent lines or the display of lines in an inappropriate order.

FIG. 2 shows how the 50% scaling of an interlaced image having two fields can result in an undesired granularity in the final image. With 50% scaling, every other line in each field is discarded. When the beginning of the second odd field is detected, the scaling counter is reset and the first and successive, alternating lines from that field are displayed. The result is that lines 0,1,4,5,8 and 9 are displayed. Thus, lines 2 and 3 and lines 6 and 7 are discarded. With two successive lines missing, the output image appears to have annoying discontinuities.

In the special case of reducing the image by 50%, a known technique which works well is to discard all the information contained in either the first or second field. Although the technique works well in the special case of 50% reduction, it obviously cannot be used with other scaling factors. Consequently, the machine performing the scaling will need to store at least two algorithms: a first for the special case of 50% reduction and a second for other scaling requirements.

One attempt to correct the noted discontinuities requires that the scaling counter not be reset when moving from the first to second field. As shown in FIG. 3, when a two field image of 16 total lines is scaled by 2/3, this technique results in three pairs of lines (3/2, 9/8, 15/14) being displayed in the wrong order. Output of this type is also undesirable.

In general, known scaling methods for interlaced data only function well when the scaling factor is a binary factor (e.g. 50%, 25%, 12.5%, etc.) of the original image. The use of non-binary scaling factors with known scaling methods results in discontinuities and misplaced display lines.

SUMMARY OF THE INVENTION

The present invention provides a method and apparatus for scaling interlaced video data by any desired scaling factor which effectively eliminates discontinuities and misplaced data. The method and apparatus are not limited to interlaced data having only two fields.

Any number of fields can be accommodated, as can any number of lines in the image.

The method looks ahead to the desired output for a set of data having N fields and a scaling factor of S. As the most common interlaced video signals use two fields, the discussion herein will be largely confined to interlaced data having only two fields. However, the extension of this method to N fields is straightforward.

For every frame of interlaced data having two fields, the method simultaneously considers whether the next line from each field is to be kept or discarded. In other words, the method accepts the scaling factor as input, and, for each input line in each field, considers whether the corresponding input lines from each data field will be kept or discarded in the final display image. As each successive input line is considered, it is either stored in the output frame buffer or discarded. Simultaneously, space is either reserved in the output frame buffer for the next line, which will come from a different field, or no space is left. As each new field is entered, the counter which determines if a line is kept or discarded is reset to an appropriate value. When only two fields are being displayed, the counter usually resets to 1, if the first output line of the display is filled. In the case where nothing has been put into the first line of the output display, the counter resets to 0.

By considering the data in both fields simultaneously and arranging for the proper space to remain available in the output frame buffer for the line from the other field, the occurrence of discontinuities and misplaced data is avoided.

The invention will now be discussed in conjunction with the figures described below.

BRIEF DESCRIPTION OF THE DRAWINGS

FIG. 1 shows how interlaced data is displayed on a display device;

FIG. 2 shows how one method of scaling interlaced data results in discontinuities;

FIG. 3 shows how another method of scaling interlaced of data results in a disordered display of the data;

FIG. 4 is a block diagram of one circuit capable of performing the method of the present invention;

FIG. 5 is a table showing how the present invention operates on interlaced data from two header fields;

FIG. 6 is an action table for interlaced data with 2 header fields; and

FIG. 7 is a table showing how the present invention would enlarge data having two fields.

DESCRIPTION OF THE SPECIFIC EMBODIMENT(S)

Scaling circuit 10 is capable of performing the scaling method taught herein and is shown in FIG. 4. During each HSYNC waveform period, clock circuit 15 produces 2 clock pulses. In this embodiment, both HSYNC and VSYNC are active low. These clock pulses are used to increment MOD N Counter 20 twice for each line of input data. MOD N Counter 20 also accepts as input the scaling factor N. The output of MOD N counter 20 combined with the output from clock circuit 15 indicates the action to be taken for both the present line of video data and the next line of video data, the successive lines coming from the odd and even fields. The results are temporarily stored in This Line flip-flop FF4 and Next line flip-flop FF5. Flip-flop FF3 temporarily stores the result of whether or not an input line was placed in the first line of the output buffer. AND gates 16 and 17 together detect the first line of the first field, clocking flip-flop FF3. The outputs from flip-flops FF3, FF4, and FF5, along with the output of clock circuit 15, are applied to a logic circuit network 30, which generates the proper inputs for Memory Row Address Counter 35. The output of the row address counter indicates the memory row address for storing the current line of input. Depending upon the contents of FF4 and FF5, memory row address counter is incremented by 0, 1, 2, as shown in the truth table shown in FIG. 6.

It should be noted that circuit 10 is suitable for scaling interleaved video data having only two fields. However, with suitable modifications, the nature of which should be obvious once this invention is understood, the circuit can be used to scale interleaved video having up to N fields. In this case, instead of two flip-flops FF4 and FF5, there would be N similar flip-flops for storing the result for the next line from each of the N fields. Similarly, instead of one flip-flop FF3 to indicate the presence of videodata in the first output line position, N-1 such flip-flops would be required.

FIG. 5 is a table showing how the present invention will function with 14 lines of data in two fields. The scaling factor is 5/6. On line 0 of the even field, clock circuit 15 provides two clock pulses. The output of Mod N counter 20 is stored in FF4 and FF5. This indicates that both input lines 0 and 1 will be kept in the final output. The logic switch (FF3 in FIG. 4) is also turned on (high) to indicate that there is output for the first line of the image in memory. At input line 2, the counter is again incremented twice, indicating that lines 2 and 3 will be part of the final output. At line 4, the counter counts up to 4, indicating that input line 4 will be kept and displayed. However, as indicated by the scaling factor, the sixth line of each group of 6 lines is to be discarded. Hence, line 5 is discarded and no space is left for it in the output frame buffer. This pattern continues until the second field is detected.

When the second field is detected, the method first checks flip-flop FF3 (FIG.4) If it is high, indicating that the first input line is part of the output display, the counter is reset to 1. If there is no output in the buffer for display line 0, the switch will be low and the MOD M counter will be reset to 0. In the example, the counter is reset to 1. Each line in the second input field is then processed in the same manner as the lines in the first field. The final output of this example is listed in the column marked "Display" in FIG. 5. As illustrated, the data output is in proper order with no discontinuities.

FIG. 6 is an action table showing the operation of the present invention and describing that action in a more general manner. Once again, the interlaced data will be assumed to have 2 fields. The table has a First Field Input Line column, a Second Field Input Line column, Action column, and Memory Address Pointer Action column. The first case shows the action taken when the method determines that the lines in both fields should be kept. The first field's line is put into the output frame buffer at address N. A space is left in the output frame buffer by incrementing the address counter by 2. In the second case, where it is determined that the first line should be kept and displayed and the second line deleted, the input line in the first field is placed in the output frame buffer at address N. As the input line in the second field will be dropped the address counter is only incremented by 1. In the third case, the input line in the first field is discarded and the input line in the second field is displayed. Therefore, address location N receives no data. However, as address location N must be left blank to receive data for the input line from the second field, the address counter is incremented by 1 to leave the appropriate space. In the fourth and last case, where the input lines from both fields are discarded, no data is placed in address N and the address counter is not advanced.

Although FIG. 6 applies specifically to a set of interlaced data having two fields, the expansion of this "truth" table to more fields is easily done. Additionally, it should be noted that for all cases where the scaling factor is binary (½, ¼, etc.), the present method simplifies to those simple techniques described in the background of this invention. For example, if the image is to be reduced by 50%, substituting ½ for the scaling factor in the example shown in FIG. 5 would result in the Mod N counter showing 1,x for all entry lines in the first field and x,1 for all entry lines in the second field. This is equivalent to discarding all of the second field's data. It is important to note that even in these binary scaling factor cases, the full method and apparatus disclosed herein is to be utilized, not the methods known in the prior art.

FIG. 7 shows how the present invention could be used to enlarge an image. In the example, the image will be enlarged by ⅓, for a scaling factor of 4/3. Although the same apparatus is used, the truth table is altered. Instead of an X indicating that a line is to be deleted, a 0 is used to indicate the need to repeat the noted line twice. For line 0 in the even field, the MOD M counter produces a 1,1 output, which indicates that both line 0 and line 1 are to be saved. Line 0 is put in the frame buffer and a space needs to be left in the buffer to accommodate line 1. Therefore, the address counter is incremented twice. When line 2 is reached, the output of the counter is 0, 1, indicating that line 2 will be duplicated and line 3 saved. In this case line 2 and a copy of line 2 are placed in the frame buffer, and a space is left in the buffer for line 3. Also, the line address is incremented by 3. Line 4 demonstrates the inverse of the situation for line 2-line 4 is saved but not duplicated, while line 5 is saved and copied. Although the situation does not occur in this example, if both lines are 0, both are saved and duplicated and the address counter would be advanced by 4. Although the use of this method with this apparatus for enlarging images would require a very fast memory, so that copies of the lines could be written quickly, such memories exist and would create only small additional costs to implement this invention.

Although there are small cost and complexity tradeoffs required to implement this invention in a given machine or environment, the efficiency of the method, which simplifies in the special binary cases to the most optimum solution, is vastly greater than any other known method or combination of methods.

The present invention has now been described in detail, in the context of one specific embodiment. Nothing herein should be taken to limit this invention to the particular embodiment discussed. For example, with straightforward modification to the logic circuits, interlaced data having three or more header fields could be readily accommodated. Expanding the image in addition to shrinking it can be easily done by repeating lines as opposed to deleting them. Given these possibilities, this invention should not be considered in a narrow, restrictive sense, but rather in a broad, expansive sense.

We claim:

1. An apparatus for scaling interlaced video data, the interlaced video data having N fields of a predetermined number of input data lines and the interlaced video data being scaled by a scaling factor S, the scaled interlaced video data forming an output image, the apparatus comprising:
   clock means for producing N clock pulses for each input data line of interlaced video data;
   modulus N counter means for producing binary modulus output for each input data line of interlaced video data, the binary output data depending upon the results of the modulus N division produced by said modulus N counter means, the modulus N counter being coupled to the clock means;
   first register means coupled to the modulus N counter means and to the clock means for indicating that the first input data line will be used in the first position of the output image;
   N line storage register means for indicating whether to store or discard the present input and N-1 next input lines, the N line storage register means being coupled to the modulus N counter means; and
   memory line address counter means coupled to the N line storage register means and to the first register means for determining the next memory line address for storing input data lines.

2. A scaling method for use with interlaced video data, the video data having N fields, each field having a predetermined number of input lines, the method comprising the steps of:
   receiving as input a scaling factor, expressible as a fraction having a numerator and a denominator, the numerator indicating the number of output lines for a predetermined number of input lines, the predetermined number of input lines equalling the denominator;
   sequentially processing each successive input line;
   counting from 1 to the predetermined number of input lines in steps of 1, the count resetting to 1 whenever the count is equal to the predetermined number, the count being incremented N times for each input line;
   transferring the input line to an output device and leaving N blank spaces in the output device if each of the N counts for the input line is less than or equal to the numerator;
   transferring the input line to the output device and leaving no blank spaces in the output device if the first count is equal to the numerator and the successive N counts are greater than the numerator and less than or equal to the denominator;
   deleting the input line and leaving N blank spaces in the output device if the first count is greater than the numerator and less than or equal to the denominator and the successive N counts are less than or equal to the numerator;
   deleting the input line and leaving no blank spaces if each of the N counts for the input line is greater than the numerator and less than or equal to the denominator; and
   resetting the count to N when each successive N field is encountered, if the input line from all previous fields was transmitted to the output device, and resetting the count to M, where M is the last field whose input line was not transmitted to the output device.

3. A scaling method for use with interlaced video data, the video data having two fields, each field having a predetermined number of input lines, the method comprising the steps of:

receiving as input a scaling factor, expressible as a fraction having a numerator and a denominator, the numerator indicating the number of output lines for a predetermined number of input lines, the predetermined number of input lines equalling the denominator;

sequentially processing each successive input line;

counting from 1 to the denominator in steps of 1, the count resetting to 1 whenever the count is equal to the denominator, the count being incremented two times for each input line;

transferring the input line to an output device and leaving no blank spaces in the output device if the first count is equal to the numerator and the successive count is greater than the numerator and less than or equal to the denominator;

deleting the input line and leaving one blank space in the output device if the first count is greater than the numerator, and less than or equal to the denominator and the successive count is less than or equal to the numerator;

deleting the input line and leaving no blank spaces if the first and second count for the input line are both greater than the numerator and less than or equal to the denominator; and resetting the count to 2 when the second field is encountered, if the first input line in the first field was transferred to the output device and, if the first input line in the first field was not transferred to the output device, resetting the count to 1.

4. An apparatus for scaling interlaced video data, the video data having N fields, each field having a predetermined number of input lines, the apparatus comprising:

means for receiving and storing a scaling factor, the scaling factor being expressed as a fraction having numerator and denominator, the numerator indicating the number of output lines for a predetermined number of input lines, the predetermined number of input lines equalling the denominator;

means for sequentially processing each successive input line;

means for counting from 1 to the predetermined number of input lines in steps of 1, the count resetting to 1 whenever the count is equal to the predetermined number, the count being incremented N times for each input line;

means for transferring the input line to an output device and leaving N blank spaces in the output device of each of the N counts for the input line is less than or equal to the numerator;

means for transferring the input line to the output device and leaving no blank spaces in the output device if the first count is equal to the numerator and the successive N counts are greater than the numerator and less than or equal to the denominator;

means for deleting the input line and leaving N blank spaces in the output device if the first count is greater than the numerator and less than or equal to the denominator and the successive N counts are less than or equal to the numerator;

means for deleting the input line and leaving no blank spaces if each of the N counts for the input line is greater than the numerator and less than or equal to the denominator; and means for resetting the count to N when each successive N field is encountered, if the input line from all previous fields was transferred to the output device, and resetting, the count to M, where M is the last field whose input line was not transferred to the output device.

5. A method for scaling interlaced video data, the video data having a plurality of fields, each field having a plurality of lines, the method comprising the steps of:

determining for each line successively which one of the steps of displaying, deleting and duplicating will be performed on the line to generate the final image;

simultaneously determining for each next successive line in each of the successive fields which one of the steps of displaying, deleting or duplicating will be performed on each next successive line for the final image;

transferring the line to an output means if the step to be performed on the line is one of displaying and duplicating and reserving space in the output means if the steps to be performed on the next successive line are one of displaying and duplicating; and deleting the line if the determining step determined it should be deleted, reserving space in the final image for the successive line if the determining step for the successive line determined that one of the steps of saving and duplicating should be performed on the successive line.

* * * * *